US012238157B2

United States Patent
Pambrun

(10) Patent No.: US 12,238,157 B2
(45) Date of Patent: Feb. 25, 2025

(54) EFFICIENT STREAMING FOR CLIENT-SIDE MEDICAL RENDERING APPLICATIONS BASED ON USER INTERACTIONS

(71) Applicant: Change Healthcare Holdings, LLC, Nashville, TN (US)

(72) Inventor: Jean-Francois Pambrun, La Prairie (CA)

(73) Assignee: Change Healthcare Holdings, LLC, Nashville, TN (US)

( * ) Notice: Subject to any disclaimer, the term of this patent is extended or adjusted under 35 U.S.C. 154(b) by 0 days.

(21) Appl. No.: 17/382,701

(22) Filed: Jul. 22, 2021

(65) Prior Publication Data

US 2023/0036480 A1 Feb. 2, 2023

(51) Int. Cl.
*H04L 29/06* (2006.01)
*G06T 7/00* (2017.01)
*H04L 65/65* (2022.01)
*H04L 65/75* (2022.01)

(52) U.S. Cl.
CPC ............ *H04L 65/65* (2022.05); *G06T 7/0012* (2013.01); *H04L 65/75* (2022.05); *G06T 2207/10081* (2013.01); *G06T 2207/10088* (2013.01); *G06T 2207/10116* (2013.01)

(58) Field of Classification Search
CPC ....... H04L 65/65; H04L 65/75; G06T 7/0012; G06T 2207/10081; G06T 2207/10088; G06T 2207/10116
See application file for complete search history.

(56) References Cited

U.S. PATENT DOCUMENTS

| | | | | |
|---|---|---|---|---|
| 9,886,415 B1 * | 2/2018 | Cohen | ................ | G06F 15/163 |
| 11,194,621 B2 * | 12/2021 | Gatayama | .............. | A61B 6/504 |
| 2005/0021830 A1 * | 1/2005 | Urzaiz | .................... | H04L 47/30 |
| | | | | 709/233 |
| 2005/0114380 A1 * | 5/2005 | Eldar | ...................... | G16H 30/20 |
| | | | | 707/999.102 |
| 2006/0095944 A1 * | 5/2006 | Demircin | ............... | H04N 19/30 |
| | | | | 375/E7.181 |
| 2008/0123896 A1 * | 5/2008 | Baumgart | ........ | G11B 20/10527 |
| | | | | 382/100 |

(Continued)

*Primary Examiner* — Gil H. Lee
*Assistant Examiner* — Juan C Turriate Gastulo
(74) *Attorney, Agent, or Firm* — MARSHALL, GERSTEIN & BORUN LLP

(57) ABSTRACT

A server-side application is provided that transfers images associated with a medical study. The application receives a request to view a medical study. In response, the application opens a WebSocket or a WebTransport communication protocol communication channel between the imaging application and the server-side application. The application retrieves the images associated with medical study and places them into a queue in a priority order based on metadata associated with the study. The application then transfers the images from the queue through the communication channel in priority order. If a change is detected in the priority order (e.g., the user selects a particular image or changes the view of the images), the application may change the priority order of the images that remain in the queue. The application may select a rate to transmit the images based on information about the quality of the connection between the server-side application and the imaging application.

15 Claims, 5 Drawing Sheets

(56) References Cited

U.S. PATENT DOCUMENTS

| | | | | |
|---|---|---|---|---|
| 2013/0156095 A1* | 6/2013 | Li | H04N 21/64738 | 375/E7.126 |
| 2013/0166767 A1* | 6/2013 | Olivier | H04L 65/612 | 709/231 |
| 2013/0300846 A1* | 11/2013 | Miller | H04N 7/0127 | 348/65 |
| 2014/0078177 A1* | 3/2014 | Yamaji | G06F 16/51 | 345/634 |
| 2014/0143298 A1* | 5/2014 | Klotzer | G06F 16/9577 | 709/203 |
| 2014/0143299 A1* | 5/2014 | Klotzer | G06F 9/54 | 709/203 |
| 2016/0055305 A1* | 2/2016 | Hiriyannaiah | A61B 5/0013 | 348/14.15 |
| 2021/0090719 A1* | 3/2021 | Teeuwen | G16H 40/20 | |

* cited by examiner

EFFICIENT STREAMING FOR CLIENT-SIDE MEDICAL RENDERING APPLICATIONS BASED ON USER INTERACTIONS

BACKGROUND

A general trend in computing is to move the storage of documents, including images, to the cloud environment. When a user desires to view one of their images on their device, the images must first be transferred to the user's device where they can be rendered and displayed. While there is latency associated with the transfer of these images, for most non-commercial usage such latency is either unnoticeable or acceptable.

However, in the context of medical imaging, a medical study may include hundreds or thousands of high resolution images. For example, a typical Computer Tomography (CT) scan is composed of multiple series, between five and ten, each containing hundreds of images. It is not uncommon to have 3,000+ images in a study for a total of 600+ megabytes. Even with today's high bandwidth internet connections it is impractical to have the user of the medical study wait while each image is downloaded and rendered.

Thus, what is needed are improved systems and methods for transmitting images, and more specifically medical images, over a network.

SUMMARY

In order to improve the transfer of images to an image rendering application through a network, a server-side application is provided that prioritizes and transfers images associated with a medical study. The server-side application receives a request to view a medical study. In response, the server-side application opens a WebSocket communication channel between the imaging application and the server-side application. The server-side application retrieves the images associated with medical study and places them into a queue in a priority order that may be based on metadata associated with the medical study. The server-side application then transfers the images from the queue through the WebSocket communication channel in priority order. In the event that change is detected in the priority order (e.g., the user selects a particular image or changes the view of the images), the server-side application may change the priority order of the images that remain in the queue (e.g., the images that have not yet been transmitted). The server-side application may select a rate to transmit the images based on information about the quality of the connection between the server-side application and the imaging application.

In an embodiment, a method is provided. The method includes: receiving a request open a study by a server from an image viewing application; retrieving a plurality of images associated with the study by the server; determining a first order for the images in the plurality of images by the server; opening a communication channel between the server and the image viewing application by the server; and transmitting the plurality of images to the image viewing application by the server through the communication channel according to the first order.

Embodiments may include some or all of the following features. The communication channel may be a WebSocket communication channel or a WebTransport communication protocol. The study may include a medical study. The images in the plurality of images may include one or more of X-Ray images, CT scan images, and MRI images. The method may further include determining an optimal transmission rate between the image viewing application and the server and transmitting the plurality of images at the optimal transmission rate. Determining the optimal transmission rate may include determining a ping between the server and the image viewing application and determining the optimal transmission rate based on the ping. The method may further include: receiving an indication of interaction with the study by a user; determining a second order for the images in the plurality of images based on the indication of interaction; and transmitting the plurality of images to the image viewing application by the server through the communication channel according to the second order. Transmitting the plurality of images to the image viewing application by the server through the communication channel according to the first order may include: placing the plurality of images in an image queue according to the first order; and transmitting the plurality of images from the image queue.

In an embodiment, a system is provided. The system includes an image viewing application and a server. The server is adapted to: receive a request open a study from the image viewing application; retrieve a plurality of images associated with the study; determine a first order for the images in the plurality of images; open a communication channel between the server and the image viewing application; and transmit the plurality of images to the image viewing application through the communication channel according to the first order.

Embodiments may include some or all of the following features. The communication channel may be a WebSocket communication channel or a WebTransport communication protocol. The study may include a medical study. The images in the plurality of images may include one or more of X-Ray images, CT scan images, and MRI images. The server may be further adapted to: determine an optimal transmission rate between the image viewing application and the server and transmitting the plurality of images at the optimal transmission rate. Determining the optimal transmission rate may include determining a ping between the server and the image viewing application and determining the optimal transmission rate based on the ping. The server may be further adapted to: receive an indication of interaction with the study from a user; determine a second order for the images in the plurality of images based on the indication of interaction; and transmit the plurality of images to the image viewing application through the communication channel according to the second order. Transmitting the plurality of images to the image viewing application by the server through the communication channel according to the first order may include: placing the plurality of images in an image queue according to the first order; and transmitting the plurality of images from the image queue. The server may be further adapted to: determine a second order for the images of the plurality of images; reorder the images in the image queue that have not yet been transmitted according to the second order; and transmit the plurality of images from the image queue.

In an embodiment, a method is provided. The method includes: receiving a request open a study by a server from an image viewing application; retrieving a plurality of images associated with the study by the server; determining a first order for the images in the plurality of images by the server; opening a communication channel between the server and the image viewing application by the server; and placing the plurality of images in an image queue according to the first order; and transmitting the plurality of images to the image viewing application by the server through the communication channel from the queue.

Embodiments may include some or all of the following features. The communication channel may be a WebSocket communication channel. The study may include a medical study. The images in the plurality of images may include one or more of X-Ray images, CT scan images, and MRI images. The method may further include determining an optimal transmission rate between the image viewing application and the server and transmitting the plurality of images at the optimal transmission rate. Determining the optimal transmission rate may include determining a ping between the server and the image viewing application and determining the optimal transmission rate based on the ping. The method may further include: receiving an indication of interaction with the study by a user; determining a second order for the images in the plurality of images based on the indication of interaction; and transmitting the plurality of images to the image viewing application by the server through the communication channel according to the second order.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate an image transmission system and method. Together with the description, the figures further serve to explain the principles of the image transmission system and method described herein and thereby enable a person skilled in the pertinent art to make and use the image transmission system and method system and method.

DETAILED DESCRIPTION

Figure 1:
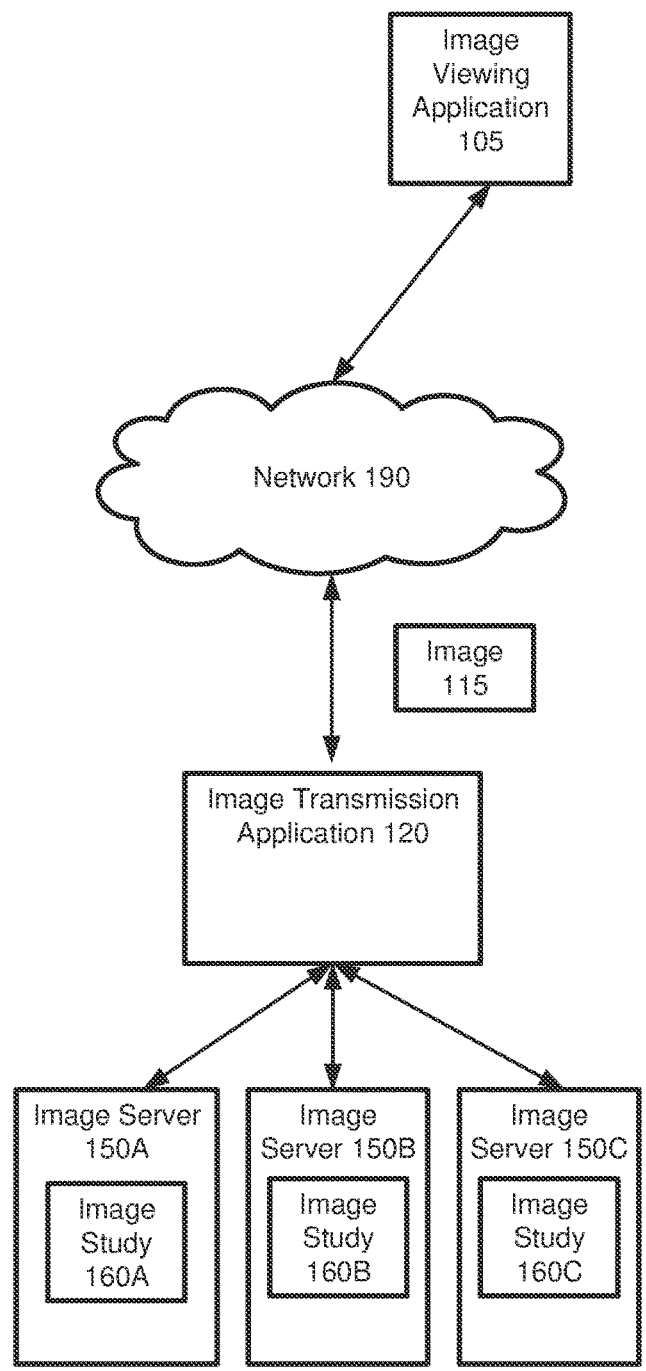
FIG. 1 is an example environment for transmitting images to imaging applications.

FIG. 1 is an example environment 100 for transferring images to an image viewing application. As shown, the environment 100 includes an image viewing application 105 in communication with an image transmission application 120 through a network 190. The network 190 may include a combination of private and public networks (e.g., the internet). The image transmission application 120 may be executed by a general purpose computing device such as the computing system 500 illustrated with respect to FIG. 5.

The imagine viewing application 105 may be an application to view images 115 and other data included in an image study 160 (e.g., the image studies 160A, 160B, and 160C). The image study 160 may be a medical image study 160 and may include a variety of medical images 115 including x-ray images, CT scan images, and MRI images. Other types of images 115 may be included. Example images 115 include the DICOM modalities listed in table 1 below.

TABLE 1

| | |
|---|---|
| CR | Computed Radiography |
| CT | Computed Tomography |
| MR | Magnetic Resonance |
| US | Ultrasound |
| OT | Other |
| BI | Biomagnetic imaging |
| CD | Color flow Doppler |
| DD | Duplex Doppler |
| DG | Diaphanography |
| ES | Endoscopy |
| LS | Laser surface scan |
| PT | Positron emission tomography (PET) |
| RG | Radiographic imaging (conventional film/screen) |
| ST | Single-photon emission computed tomography (SPECT) |
| TG | Thermography |
| XA | X-Ray Angiography |
| RF | Radio Fluoroscopy |
| RTIMAGE | Radiotherapy Image |
| RTDOSE | Radiotherapy Dose |
| RTSTRUCT | Radiotherapy Structure Set |
| RTPLAN | Radiotherapy Plan |
| RTRECORD | RT Treatment Record |
| HC | Hard Copy |
| DX | Digital Radiography |
| NM | Nuclear Medicine |
| MG | Mammography |
| IO | Intra-oral Radiography |
| PX | Panoramic X-Ray |
| GM | General Microscopy |
| SM | Slide Microscopy |
| XC | External-camera Photography |
| PR | Presentation State |
| AU | Audio ECG |
| EPS | Cardiac Electrophysiology |
| HD | Hemodynamic Waveform |
| SR | SR Document |
| IVUS | Intravascular Ultrasound |
| OP | Ophthalmic Photography |
| SMR | Stereometric Relationship |

Typically, each study 160 may include a variety of views and each view may be associated with multiple images 105. In addition, the image study 160 may include thumbnail images 105 that are of a lower resolution than the images 105 that they represent.

Due to the size of medical studies, rather than store the image studies 160 locally at or near the computing device that executes the image viewing application 105, the images studies 160 (and associated images 115) may be stored on one or more images servers 150 (e.g., the image servers 150A, 150B, and 150C). As shown, there may be multiple image servers 150 to provide both load balancing and improved image retrieval performance as multiple images 115 can be retrieved from each image server 150 concurrently. Some or all of the image servers 150 may be implemented together or separately using a cloud-computing environment.

One drawback with the image server 150 based image 115 retrieval system described above, is that the HTTP1 protocol is typically limited to 6 concurrent concurrences. Thus, for a browser-based application like the image viewing application 105, the application would be limited to downloading six images 105 from the image server 150 at any time. Such a limitation will result in diminished image study 160 experience for users of the application 105 especially when compared with a traditional local-storage based image viewing application.

Accordingly, to improve the performance of image viewing applications 105, the environment 100 includes an image transmission application 120. The image transmission application 120 may be an application that sits between the image servers 150 and the image viewing application 105. The image transmission application 120 may be a server-side application and may be implemented using one or more general purpose computing devices such as the computing system 500. In addition, some or all of the image transmission application 120 may be implemented in a cloud computing environment.

Rather than communicate with the image servers 150, the image viewing application 105 may send requests for image studies 160 to the image transmission application 120. The image transmission application 120 may then retrieve the images 105 of the image studies 160 and may begin transferring the images 115 to the image viewing application 105 using a communication channel that is capable of transmitting a greater number of images 115 concurrently to the image viewing application 105 than HTTP. This allows the image viewing application 105 to achieve reduced latency and improved responsiveness than image viewing applications 105 that rely on tradition HTML-based image transmission techniques. The image transmission application 120 is described further below with respect to FIG. 2.

Figure 2:
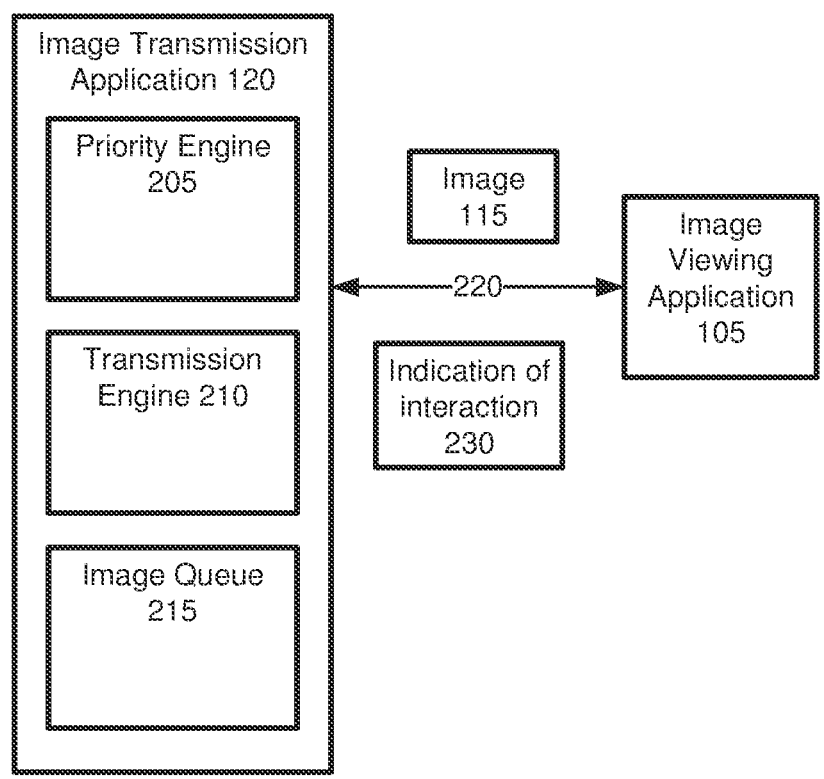
FIG. 2 is an illustration of example image transmission system.

FIG. 2 is an illustration of an example image transmission application 120. As shown, the image transmission application 120 includes several components including, but not limited to, a priority engine 205, a transmission engine 210, and an image queue 215. More or fewer components may be supported.

When a request for an image study 160 is received by the image transmission application 120, the priority engine 205 may initially determine a priority to transmit each image 115 of the image study 160 to the image viewing application 105. Initially, the priorities may be based on metadata associated with the image study 160 that includes information such as the order with which the images 115 are initially presented in the image study 160. Images 115 presented or displayed first in the image study 160, or part of a view that is presented first, may receive a higher priority than images that are presented later. In addition, preview images (e.g., thumbnail images) may receive a higher priority because those images 105 are usually presented first in a menu or other navigation element, for example.

In another example, the priorities may be based on the viewing history of the images 115 in the study 160. For example, the priority engine 205 may assign a higher priority to images 105 that were most recently viewed by a user, or that were the last images 105 that were viewed by the user. Any method for assigning priorities to images 105 in an image study 160 may be used.

The priority engine 205 may place the images 105 of the image study 160 into the image queue 215 in an order that is determined by the priorities determined for the images 115. Any type of queues or equivalent data structures may be used.

The transmission engine 210 may establish a communication channel 220 with the image viewing application 105 and may transmit the images 115 from the image queue 215 to the image viewing application 105 via the channel 220 in the order in which the images 115 were placed in the image queue 215. Depending on the embodiment, the channel 220 may be established using a protocol such as WebSocket or WebTransport. WebSocket is a communication protocol that allows the transmission engine 210 to send images 115 to the image viewing application 105 without those images 115 having explicitly requested by the application 105. This allows the image viewing application 105 to buffer or store the received images 115 before they are selected by the user from the image study 160.

In some embodiments, the priority engine 205 may receive what is referred to an indication of interaction 230 from the image viewing application 105. The indication of interaction 230 may indicate that the user has interacted with the image study 160. For example, the user may have selected an image 115 to view in the application 105 or has selected a different view or set of images 115 to browse in the application 105.

In response to the interactions, the priority engine 205 may recompute the priority of the images 115 that remain in the image queue 215 (i.e., the images 115 that have not yet been transmitted to the image viewing application 105). For example, if the indication 230 indicates that the user has selected a particular image 115, the selected image 115 (assuming it was not sent already) may be assigned the highest priority by the priority engine 205, and any images 115 related to the selected image 115 (e.g., related unsent images 115 likely to be viewed next) may similarly have their priority increased. The priority engine 205 may then rearrange the images 115 in the image queue 215 according to the new priorities and the transmission engine 210 may continue to transmit the images 115 from the image queue 215.

In some embodiments, the priority engine 205 may be implemented on the client side (i.e., as part of the same computing environment as the image viewing application 105), rather than as part of the image transmission application 120. In such embodiments, the priority engine 205 may determine the priorities for each image 115 (or image portion) as described above and may send instructions to the image transmission application 120 to reorder the contents of the image queue 215 based on the determined priorities.

In some embodiments, in addition to complete images 115, the transmission engine 210 may transmit portions of images 115. The portions of images 115 may be prioritized and transmitted from the image queue 215 similarly as described above for images 115.

The transmission engine 210 may select a transmission rate to transmit the images 105 from the image queue 215. In some embodiments, the transmission rate may be a maximum transmission rate that the channel 220 will support.

Alternatively, the transmission engine 210 may select a select a slower transmission rate so as to not overwhelm the channel 220 and/or the application 105 in the event that the transmission engine 210 needs to change the priority of the images 115 in the queue 215 and send different images 115 to the image viewing application 105. For example, suppose the transmission engine 210 changes the priority of the images 115 due to the user selecting a different view of the image study 160 and indicated by an indication of interaction 230. If the transmission engine 210 had been sending images 105 using the maximum capacity of the channel 220, the image viewing application 105 would have to wait until all of the images 115 already sent in the channel 220 had been received and stored before the newly requested images 115 could be received and rendered to the user. This would appear to the user as latency and diminish their user experience. By using a rate that less than the maximum, in the event of a change of view, image selection, or other user interaction, the re-prioritized images 115 will be more quickly received by the application 105 as there is less of an image 115 backlog in the channel 220 or buffer.

In some embodiments, the maximum rate may be selected based on a ping between the image viewing application 105 and the transmission engine 210, as well as other information such as the processing power of the image viewing application 105, and a size of a storage buffer used the image viewing application 105 to store images 115.

In some embodiments, the maximum rate may be selected using two factors 1) ping time and 2) a moving average of the transfer rates of the last few images 115. Each image 115 is acknowledged by the client. On the server side, the transmission engine 210 may use the ack message along with the size of the data sent (e.g., the image 115 or image 115 portion) to estimate the transfer rate that the link can support. The transmission engine 210 may then select the maximum rate so that the inflight data is just over the latency (so the rate can increase if the capacity gets better, otherwise the measured rate would constantly decrease in in feedback loop).

Figure 3:
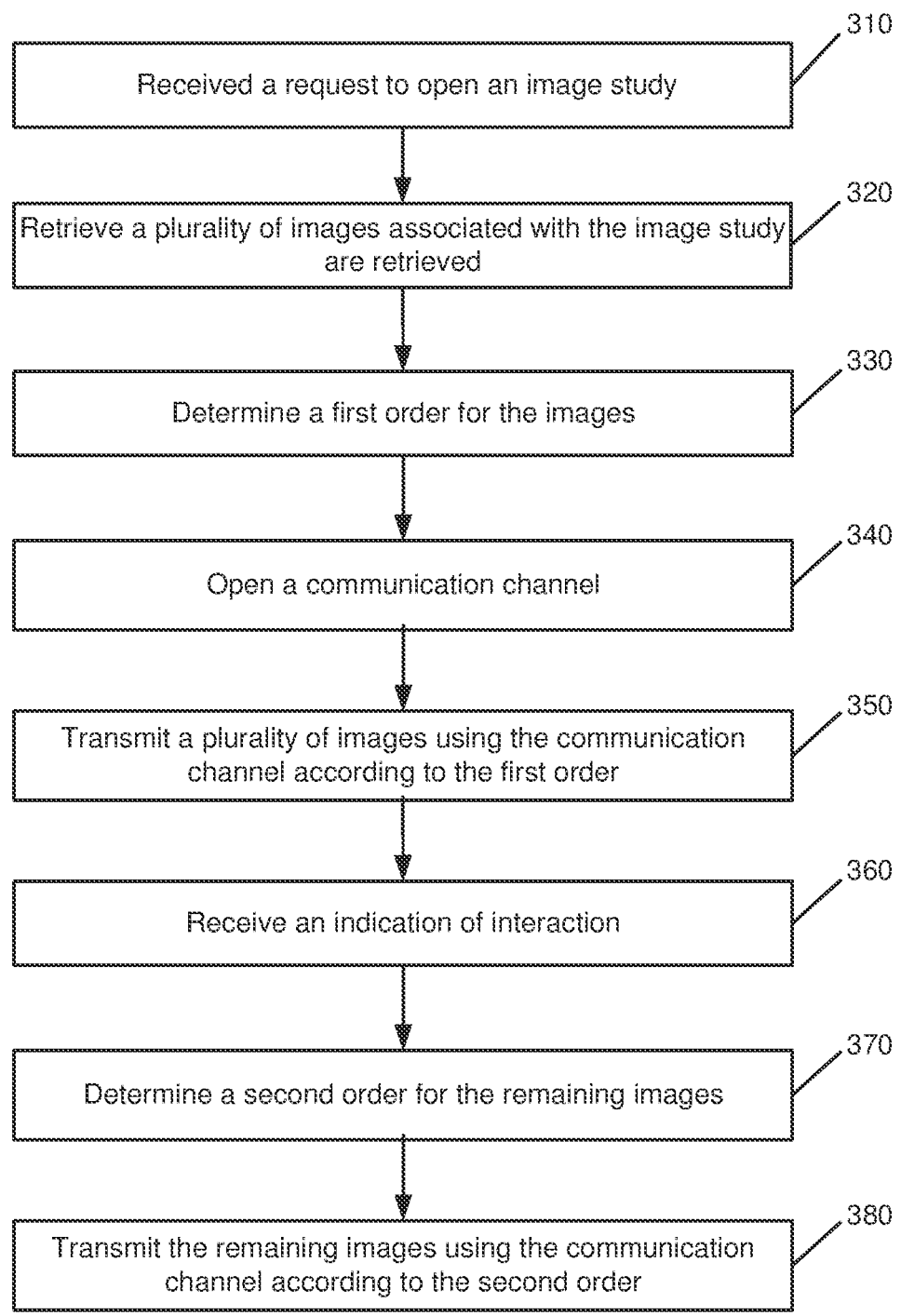
FIG. 3 is an illustration of an example method for transmitting images to an image viewing application.

FIG. 3 is an illustration of an example method transmitting images to an image viewing application. The method 300 may be implemented by the image transmission application 120.

At 310, a request to open an image study is received. The request may be received by the image transmission application 120 from the image viewing application 105 through the network 120. The image study 160 may be a medical image study and may include a plurality of medical images 115. The medical images 115 may include x-ray images, CT scan images, MRI images, etc. The study 160 may include a plurality of views and each view may be associated with a different plurality of images 115. The images 115 of the image study 160 may be stored on one or more image servers 150.

At 320, a plurality of images associated with the image study are retrieved. The images 115 may be retrieved from the image servers 150 by the image transmission application 120. Depending on the embodiment, each image server 150 may include the plurality of images 115 and the image transmission application 120 may retrieve various images 115 from each image server 150 in parallel.

At 330, a first order for the images is determined. The first order may be determined by the priority engine 205 of the image transmission application 120 or the client device. In some embodiments, the image transmission application 120 may determine the first order by first determining a priority for each image 115. The priority may be based on metadata associated with the image study 160 that defines the order with which the images 115 in the image study are initially presented. The priority may also be based on heuristics such as prioritizing thumbnail images 115 because they are often displayed first to the user by the image viewing application 105. The priority engine 205 may place the images 115 into the image queue 215 according to the first order. In embodiments where the priority engine is part of the client device, the priority engine 205 may provide instructions to the image transmission application 120 to place the At 340, a communication channel is opened. The communication channel 220 may be opened between the image viewing application 105 and the image transmission application 120 by the transmission engine 210. The communication channel 220 may be a WebSocket communication channel 220 or a WebTransport communication channel 220. Other types of communication channels may be used.

At 350, the plurality of images is transmitted. The plurality of images 115 may be transmitted by the transmission engine 210 to the image viewing application 105 through the communication channel 220 according to the first order. For example, the transmission engine 210 may transmit the images 115 in order from the image queue 215.

At 360, an indication of interaction is received. The indication of interaction 230 may be received from the image viewing application 105 by the priority engine 205. The indication of interaction 230 may be an indication that the user had interacted with the image study 160 by selecting an image 115, or by selecting a particular view, for example.

At 370, a second order for the remaining images is determined. The second order may be determined by the priority engine 205 based on the indication of interaction 230. In some embodiments, the priority engine 205 may determine the second order by determining a new priority for each image 115 that remains in the image queue 215. For example, if the indication of interaction 230 indicated that the user selected a particular view from the image study 160, then the images 115 associated with that view that have not yet been transmitted to the image viewing application 105 may receive a higher priority than images 115 not associated with the view. The priority engine 205 may then rearrange the remaining images 115 in the image queue 215 according to the second order.

At 380, the remaining images are transmitted. The remaining images 115 may be transmitted to the image viewing application 105 by the transmission engine 210 according to the second order. For example, the transmission engine 210 may transmit the remaining images 115 in the second order from the image queue 215.

Figure 4:
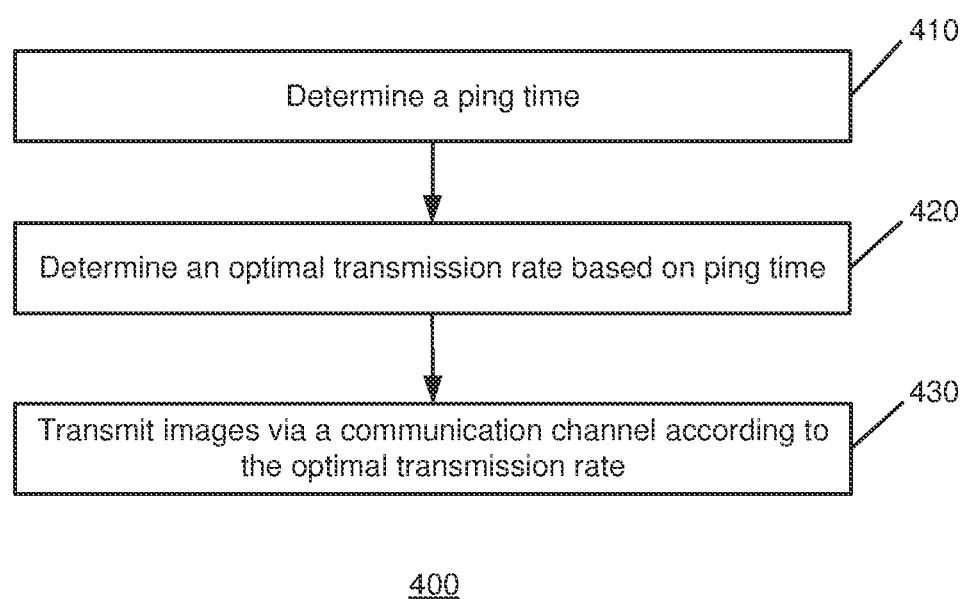
FIG. 4 is an illustration of a method for determining a transmission rate for an image transmission system.

FIG. 4 is an illustration of a method for determining a transmission rate for an image transmission system. The method 400 may be implemented by the image transmission application 105.

At 410, a ping time is determined. The ping time may be determined by the transmission engine 210. The ping time may be determined between the image viewing application 105 and the transmission engine 210 over the communication channel 220.

At 420, an optimal transmission rate is determined. The optimal transmission rate may be determined by the transmission engine 210 based on the determined ping time.

At 430, the images of the image study are transmitted. The images 115 may be transmitted according to the optimal transmission rate by the transmission engine 210 to the image viewing application 105. Periodically, the transmission engine 210 may recalculate the optimal transmission rate (e.g., based on a new ping or other values) and any remaining images 115 in the image queue 215.

Figure 5:
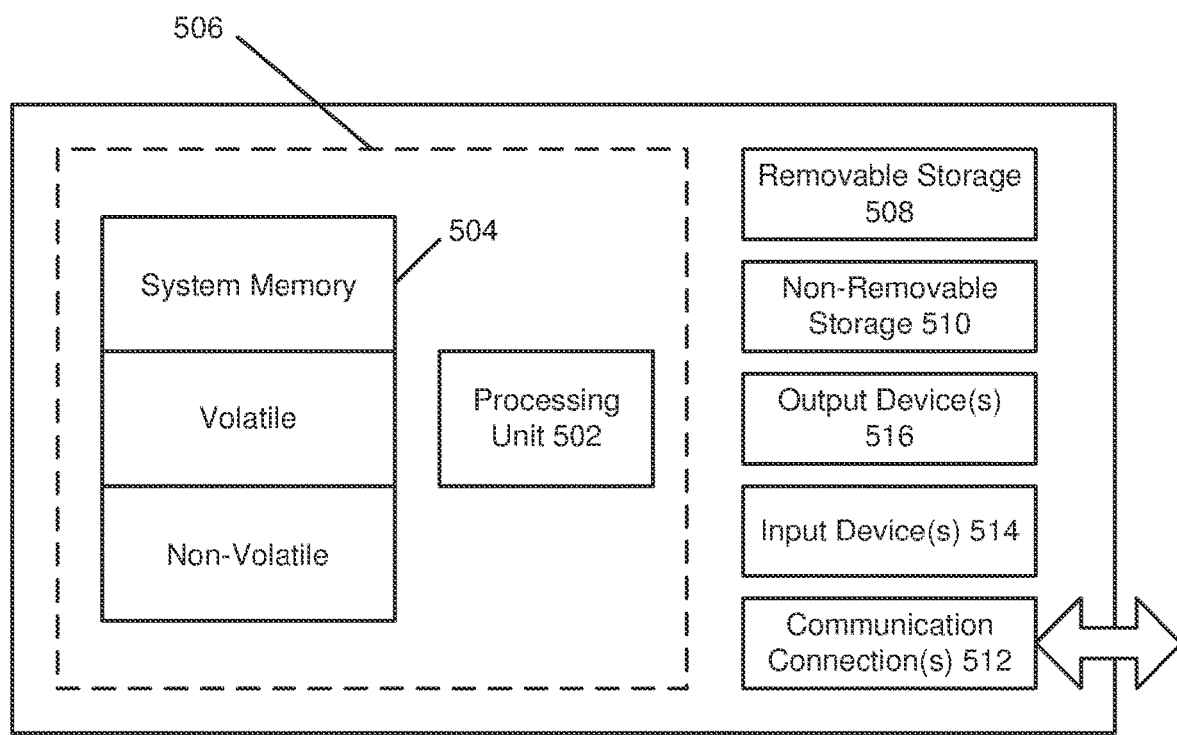
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by one or more processors of a server system and from an image viewing application executing on a computing device different than the server system, a request to open a study;
receiving, by the one or more processors of the server system, a plurality of images associated with the study;
receiving, by the one or more processors of the server system, a viewing history of each image of the plurality of images, wherein each image of the plurality of images is associated with a view of a plurality of views;
determining, by the one or more processors of the server system, a first transmission order for the plurality of images based on the viewing history of each image of the plurality of images;
opening, by the one or more processors of the server system, a communication channel between the server system and the image viewing application;
determining, by the one or more processors of the server system, a size of a storage buffer used by the image viewing application;
calculating, by the one or more processors of the server system, an average transmission rate for one or more images previously transmitted by the server system to the image viewing application;
determining, by the one or more processors of the server system, an optimal transmission rate between the server system and the image viewing application based on the size of the storage buffer, processing power of the image viewing application, and the calculated average transmission rate;
placing, by the one or more processors of the server system, the plurality of images in an image queue according to the first transmission order;
transmitting, by the one or more processors of the server system, a first subset of images of the plurality of images to the image viewing application through the communication channel from the image queue according to the first transmission order and at the optimal transmission rate;

receiving, by the one or more processors of the server system, an indication of an interaction with a first image of the transmitted first subset of images by a user;
in response to receiving the indication of the interaction, determining, by the one or more processors of the server system, a second transmission order for a second subset of images of the plurality of images in the image queue based on the view associated with the first image and views of the plurality of views associated with the second subset of images, wherein the second subset of images is different than the first subset of images; and
reordering, by the one or more processors of the server system, the second subset of images in the image queue that have not yet been transmitted according to the second transmission order.

2. The method of claim 1, wherein the communication channel is a WebSocket communication channel or a WebTransport communication protocol.

3. The method of claim 1, wherein the images in the plurality of images comprise one or more of X-Ray images, CT scan images, and MRI images.

4. The method of claim 1, wherein determining the optimal transmission rate is further based on a ping between the server system and the image viewing application.

5. The method of claim 1, further comprising:
transmitting, by the one or more processors of the service system, the second subset of images to the image viewing application through the communication channel according to the second transmission order.

6. The method of claim 1, further comprising:
transmitting, by the one or more processors of the service system, the second subset of images from the image queue.

7. The method of claim 1, wherein the plurality of images are transmitted to the viewing application by the server system before any images of the plurality of images are selected by the image viewing application.

8. A system comprising:
a server system comprising:
one or more processors; and
one or more memories storing processor-executable instructions that, when executed by the one or more processors, cause the one or more processors to perform operations comprising:
receiving, from an image viewing application executing on a computing device different than the server system, a request to open a study;
retrieving a plurality of images associated with the study;
receiving a viewing history of each image of the plurality of images, wherein each image of the plurality of images is associated with a view of a plurality of views;
determining a first transmission order for the plurality of images based on the viewing history of each image of the plurality of images;
opening a communication channel between the server system and the image viewing application;
determining a size of a storage buffer used by the image viewing application;
calculating an average transmission rate for one or more images previously transmitted by the server system to the image viewing application;
determining an optimal transmission rate between the server system and the image viewing application based on the size of the storage buffer, processing power of the image viewing application, and the calculated average transmission rate;
placing the plurality of images in an image queue according to the first transmission order;
transmitting a first subset of images of the plurality of images to the image viewing application through the communication channel from the image queue according to the first transmission order and at the optimal transmission rate;
receiving an indication of an interaction with a first image of the transmitted first subset of images by a user;
in response to receiving the indication of the interaction, determining a second transmission order for a second subset of images of the plurality of images in the image queue based on the view associated with the first image, wherein the second subset of images is different than the first subset of images; and
reordering the second subset of images in the image queue that have not yet been transmitted according to the second transmission order.

9. The system of claim 8, wherein the communication channel is a WebSocket communication channel or a WebTransport communication protocol.

10. The system of claim 8, wherein the study comprises a medical study.

11. The system of claim 8, wherein the images in the plurality of images comprise one or more of X-Ray images, CT scan images, and MRI images.

12. The system of claim 8, wherein determining the optimal transmission rate is further based on a ping between the server system and the image viewing application.

13. The system of claim 8, wherein the processor-executable instructions, when executed by the one or more processors, further cause the one or more processors to perform operations comprising:
transmitting the second subset of images to the image viewing application through the communication channel according to the second transmission order.

14. The system of claim 8, wherein the processor-executable instructions, when executed by the one or more processors, further cause the one or more processors to perform operations comprising:
transmitting the second subset of images from the image queue.

15. One or more non-transitory computer-readable media storing processor-executable instructions that, when executed by one or more processors of a server system, cause the one or more processors to perform operations comprising:
receiving, from an image viewing application executing on a computing device different than the server system, a request to open a study;
retrieving a plurality of images associated with the study;
retrieving a viewing history of each image of the plurality of images, wherein each image of the plurality of images is associated with a view of a plurality of views;
determining a first transmission order for the plurality of images based on the viewing history of each image of the plurality of images;
opening a communication channel between the server system and the image viewing application;
determining a size of a storage buffer used by the image viewing application;

calculating an average transmission rate for one or more images previously transmitted by the server system to the image viewing application;

determining an optimal transmission rate between the server system and the image viewing application based on the size of the storage buffer, processing power of the image viewing application, and the calculated average transmission rate;

placing the plurality of images in an image queue according to the first transmission order;

transmitting a first subset of images of the plurality of images to the image viewing application through the communication channel from the image queue according to the first transmission order and at the optimal transmission rate;

receiving an indication of an interaction with a first image of the transmitted first subset of images by a user;

in response to receiving the indication of the interaction, determining a second transmission order for a second subset of images of the plurality of images in the image queue based on the view associated with the first image, wherein the second subset of images is different than the first subset of images; and reordering the second subset of images in the image queue that have not yet been transmitted according to the second transmission order.

* * * * *